United States Patent [19]
Böckmann et al.

[11] 3,784,169
[45] Jan. 8, 1974

[54] METHOD OF AND APPARATUS FOR THE CONTROLLED MIXING OF TWO REACTIVE COMPONENTS

[75] Inventors: Alfred Böckmann; Rudi Keuerleber, both of Munich, Germany

[73] Assignee: Krauss-Maffei AG, Munich, Germany

[22] Filed: Apr. 5, 1972

[21] Appl. No.: 241,122

[30] Foreign Application Priority Data
Apr. 6, 1971 Germany............................ 2116665

[52] U.S. Cl...................... 259/4, 137/563, 137/606, 239/127, 259/95, 425/425
[51] Int. Cl. .......................... B01f 5/04, B01f 15/02
[58] Field of Search........................... 259/4, 18, 95; 137/563, 604, 606; 222/318; 239/127; 425/425

[56] References Cited
UNITED STATES PATENTS
3,169,833  2/1965  Breer et al. ......................... 259/4 X
3,424,439  1/1969  Baker................................... 259/4
3,605,183  9/1971  Heckrotte ......................... 259/18 X
3,617,029  11/1971  Breer et al. ............................ 259/18

FOREIGN PATENTS OR APPLICATIONS
2,046,641  9/1970  Germany

Primary Examiner—Billy J. Wilhite
Assistant Examiner—Alan I. Cantor
Attorney—Karl F. Ross

[57] ABSTRACT

A method of and an apparatus for the mixing of two interactive components, especially two components adapted to form a castable synthetic resin such as a caprolactam system wherein the components are to be combined in a high-volume ratio wherein the components are circulated along closed paths at superatmospheric pressures and, by pressure increases in the respective paths, are discharged through injection nozzles into a mixing chamber.

15 Claims, 2 Drawing Figures

METHOD OF AND APPARATUS FOR THE CONTROLLED MIXING OF TWO REACTIVE COMPONENTS

FIELD OF THE INVENTION

Our present invention relates to a method of and to an apparatus for the controlled or metered mixing of two or more components, especially reactive fluids and, more particularly, to a method for the dosed mixing of fluid components of a caprolactam system for rotational casting.

BACKGROUND OF THE INVENTION

For many purposes, it has been desired to mix two or more components of a reaction system under conditions involving the metering and dosing of the two components with great accuracy. The problem is most pronounced when the mixing ratio (i.e., the volume ratio of the predominant component to the minority component) is high, e.g., of the order of 200:1 and greater. Such high mixing ratios require the discharge of a large volume of the predominating component and a much smaller discharge of the minority component into the mixing chamber under conditions which will maintain the ratio and allow both metering operations to be carried out with accuracy.

The problem arises, to a considerable extent, in the preparation of two-component or multicomponent synthetic-resin systems for molding or casting, it being advantageous to maintain the components apart until just prior to the forming operation. For example, in the rotational casting of pipes and like articles of polymerized caprolactam, the predominating component is the monomeric lactam, while other components may include activators and catalysts. In the caprolactam system, a conventional catalyst for a conventional activator must be combined with the monomeric lactam before the latter will polymerize and set.

In earlier rotational casting systems, the components have been mixed by injection after being subjected to different thermal conditions (preheating or storing temperatures). To overcome the disadvantages obtaining when the volume ratio is high, as discussed above, it has been the practice to divide the anionically polymerizable caprolactam between two storage vessels, to mix the activator with a portion of the caprolactam in one of these vessels and to mix the catalyst with the other portion of the caprolactam. The two portions are the combined in a mixing chamber by injection under pressure. The mixing head or chamber may be maintained under an appropriate mixing temperature while the contents of the two storage vessels are maintained under respective temperatures. Pumps between the storage vessel and the mixing chamber force the two portions through injection nozzles under injection pressure into the mixing chamber.

While this system eliminates the difficulties encountered with the handling of small quantities of the minor components, it has some significant disadvantages. Firstly, the system requires two large vessels and thus considerable residues remain in the vessels even when the latter have been drained by the pumps to the maximum extent technologically feasible. Secondly, the requirement for two large vessels, with appropriate heating and temperature-control means, increases the capital cost of the installation. Thirdly, since the catalyst is premixed with one portion of the predeterminating component, while the activator is premixed with the other portion, there is no leeway for adjusting the proportion of, for example, the catalyst once the premixing step has taken place.

A further disadvantage of the system described above is that the displacement takes place by turning on a pump. Because of the inertia of the system (flow inertia as well as mechanical inertia), the metering of the components may be inaccurate and it may not be possible to obtain the desired injection relationships. The precision of the system is found to be poor, especially when flexible conduits connect the pump and/or the associated storage receptacle with the mixing chamber.

OBJECTS OF THE INVENTION

It is the principal object of the present invention to provide an improved method of mixing two components under pressure, especially two reactive components adapted to form a hardenable system for rotational casting.

Yet another object of the invention is to provide an improved method of preparing a mixture of two or more reactive components whereby the disadvantages of the earlier systems described above can be obviated.

It is also an object of the invention to provide an improved apparatus for mixing two fluid components and for carrying out the method described.

SUMMARY OF THE INVENTION

We have now found that these objects can be attained conveniently and simply, and that it is possible to mix under pressure a large-volume (predominating) component and a small volume (minor) component when at least one of the components is displaced dynamically along a path under a superatmospheric pressure which is, however, below the injection-mixing pressure, and the pressure along this path is suddenly (instantaneously) increased by blocking flow of the fluid component away from an upstream portion of the path; the fluid component is fed at the elevated pressure to the mixing chamber, preferably through a pressure-responsive valve, simultaneously with the injection of the other component into the chamber. At least the low-volume or minor component is displaced in this fashion, but preferably both components are displaced and, advantageously, circulated along respective closed paths.

According to a particular feature of this invention, the components to be mixed include caprolactam capable of anionic polymerization for rotational casting in a ratio by volume of about 200:1 to the activator and catalyst, the ratio being generally higher. The low-volume component, preferably at least one, but possibly both, are displaced under pressure along respective paths which are separated and are under dynamic flow pressure below the injection-mixing pressure, the pressure in the paths being increased to the mixing pressure simultaneously with injection. While we may use three paths for the components (caprolactam, catalyst and activator) it is preferred to mix the catalyst in a ratio of 200:1 (100 parts to 0.5 part or greater with the caprolactam component and to mix the resulting combination with the activator circulated along a closed path at a dynamic pressure of about 10 atmosphere below the injection-mixing pressure.

The dynamic pressure described above is preferably produced, at least in the case of the low-volume component, by throttling the flow thereof prior to its return to a storage vessel, the pressure increase being effected by an instantaneously triggerable blocking valve between a passage communicating with the mixing chamber and this throttle.

The advantage of the system described above resides in the use of a single large receptacle for the principal component, preferably the monomeric lactam described above. The latter can be conveniently heated and stored independently of the proportion of the low-volume component to be admixed therewith, thereby reducing the equipment cost while nevertheless permitting precise metering of the quantities of the two components and allowing a high mixing ratio.

The low-volume component may independently be maintained at any desired temperature and, of course, can be added to the high-volume component without limitation on the ratio or the precision. This has been found to be especially important for the rotational casting of caprolactam systems. The terms "rotation casting" is here used to refer to the casting of a hardenable fluid mixture into a vessel constituting a flask which is rotated about one or more axes so as to distribute the mixture uniformly along the walls of the form. For the most part, rotational casting need not use centrifugal force for applying the mixture to the form wall, but rather may simply permit the distribution by adhesion of a somewhat more viscous fluid.

The temperatures of the components and of the mixture and, therefore, the viscosity and the setting rate may be controlled within said ranges and the reaction time may be similarly altered, a factor which is important for obtaining products of the desired quality and uniformity of wall thickness. In practice, one may adjust both the temperature of a component or the mixture and the proportion of the activator during a single rotational casting to obtain the uniformity.

According to features of the invention already discussed generally above, it is possible to provide volume ratios of caprolactam to activator of 100 parts to 0.5 part or of caprolactam to catalyst of 100 parts to 0.5 part (200:1 and more) by mixing the low-volume components together (as an alternative to mixing one of these low-volume components with the high-volume components). In this case, the catalyst and activator may be mixed together and circulated by a pump against the back pressure of an adjustable throttle downstream of the pump and of a bypass into the mixing chamber. The throttle is adjusted to maintain the back pressure at 10 atm. (approximately) below the injection-mixing pressure. This system guarantees synchronization of the mixing of catalyst and activator with the caprolactam. Both of the low-volume components are then fed uniformly (with respect to one another) into the mixing chamber uniformly over the mixing period.

The injection pressure which is established in the mixing head and which serves to synchronously deliver the high-volume component and the low-volume component to the mixing head may be provided by a cut-off valve downstream of the bypass which, upon closing, causes the dynamic fluid column to be diverted from the circulation path into the mixing chamber. When the cut-off valve is reopened, circulation is restored and, under the pressure differential, the mixing nozzles may automatically close. Each of the mixing nozzles is, to this end, provided with a differential-pressure valve or pressure-relieve valve which remains closed as long as the dynamic pressure head is 10 atmospheres or more below the injection pressure but opens as the pressure rises to the injection pressure. Advantageously, the circulation path of the principal component is similarly provided with a cut-off valve which is synchronously and briefly operated to open its bypass valve at the injection mixing pressure when the cut-off valve of the low-volume component is closed.

According to yet another feature of the invention, the mixing head is a portable hand-held unit connected by flexible ducts with the recirculation paths, the flexible ducts preferably extending both to the storage vessel or reservoir or the pump of the particular path, and to the cut-off valve. Since the mixing temperature of the individual components, especially the low-volume components, is important as a determinant of the reaction time, the ducts leading to the mixing head and to the storage vessels are preferably heated or provided with insulating sheaths while the storage vessel has an insulating jacket which likewise may be heated.

DESCRIPTION OF THE DRAWING

The above and other objects, features and advantages of the present invention will be more readily apparent from the following description, reference being made to the accompanying drawing in which.

SPECIFIC DESCRIPTION

Figures 1, 2:
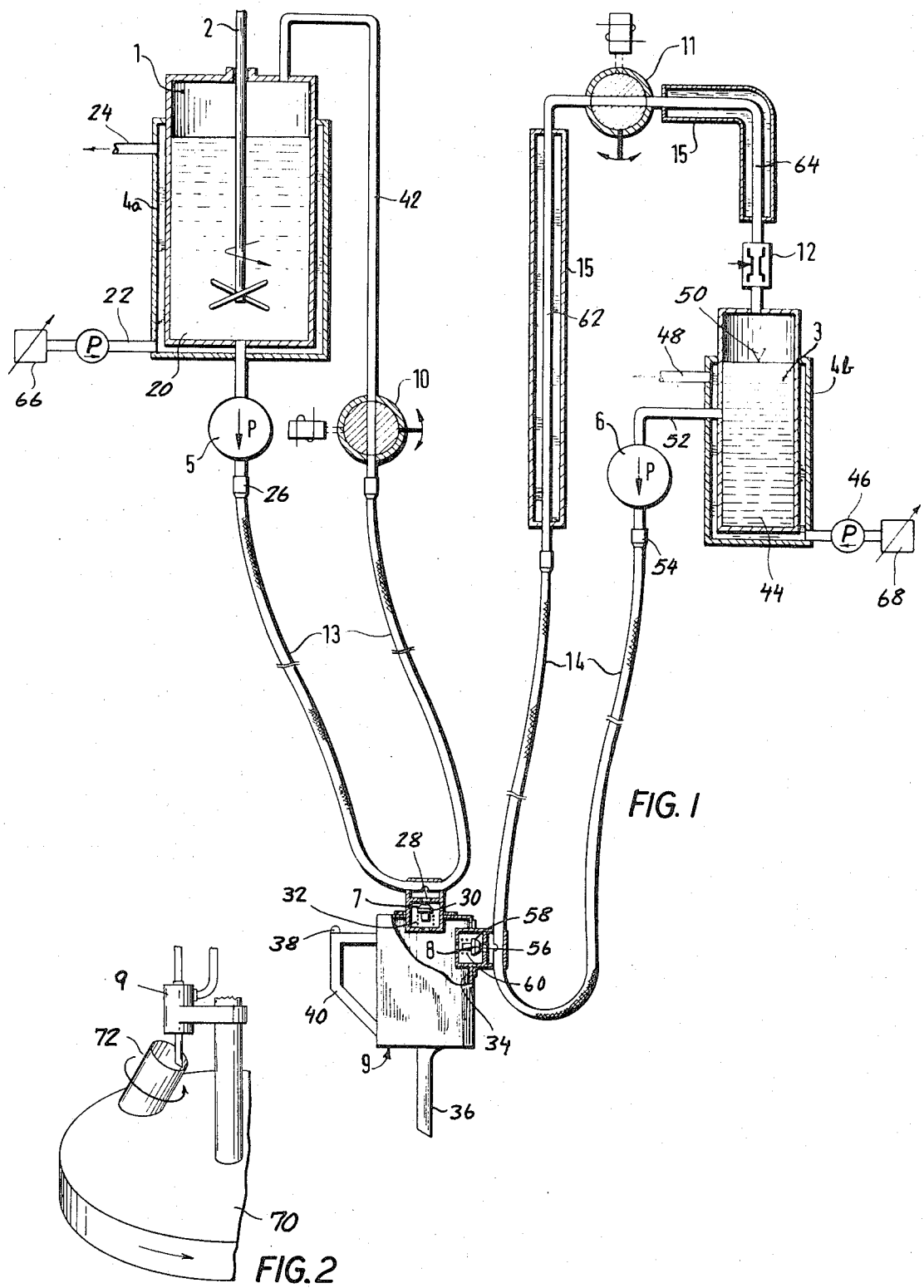
FIG. 1 is a diagrammatic elevational view of an apparatus for the mixing of two or more components of a system to be rotationally cast.
FIG. 2 is a perspective view showing the rotational-casting apparatus.

FIG. 1 discloses an apparatus for the mixing of two components, which comprises a large storage vessel 1 containing caprolactam 20 preferably mixed with a catalyst if the catalyst has not been previously mixed with the activator. A stirrer 2 extends into the caprolactam to ensure uniformity of heating and mixing thereof and the wall of the vessel 1 is thermally conductive and surrounded by a heating jacket 4a to which a heating fluid such as hot water is supplied at 22, the depleted heating fluid being recovered at 24. The vessel 1 is thus of the double-wall type. A pump 5 communicates with the vessel 1 at the base thereof and has anoutlet fitting 26 removably receiving a flexible hose or tube 13. The latter is provided at an intermediate location along its length with a pressure-threshold valve 7 having a valve aperture 28 against which the conical plug 30 is held by a spring 32, the force constant of which determines the pressure threshold. The valve is designed to open against the force of the spring when the pressure ahead of the aperture 28 reaches the injection-mixing pressure.

Valve 7 is provided on the mixing head 9 which comprises a mixing chamber 34 communicating with the valve, a spout 36 for discharging the mixture, a switch button 38 for energizing the cut-off valves, and a handle 40 enabling the head to be positioned in the mouth of a rotation-casting mold.

The flexible tube 13 returns through a valve 10 which is electromagnetically operable in response to the switch 38 and is connected by the rigid tube 42 to the receptacle 1 to complete the circulation path. If a substantial back pressure is desired for the principal component, a throttle valve may be provided in this line.

The low-volume component 44 is received in a small double-wall vessel 3 which is provided with a heating jacket 4b supplied with heating fluid at 46, the depleted fluid being recovered at 48. A level-controlling device represented diagrammatically at 50 may be used to maintain the level of the low-volume component within the vessel 3. A rigid tube 53 connected to vessel 3 delivers the low-volume component to a pump 6 whose outlet fitting 54 is connected to a flexible tube 14 provided, at a location intermediate its ends, with the pressure-threshold valve 8. This valve has an aperture 56 which is normally blocked by a valve body 58 under the control of a spring 60. The return path extends through an electromagnetically operated cut-off valve 11, triggered by switch 38 and a throttle valve 12 which is adjustable to set the back pressure at about 10 atmospheres below the injection-mixing pressure. The tube portion 62 and tube portion 64 of the return path are jacketed and a heating fluid is circulated therethrough. The temperature of the heating fluid may be regulated as represented at 66 and 68 to control the temperature of the two components.

In operation, the pumps 5 and 6 are driven to circulate the two components at the desired temperature and back pressures, whereupon the electromagnetic valves 10 and 11 are closed by switch 38. Since the pumps 5 and 6 continue to operate, the pressure rapidly builds up to the injection-mixing pressure whereupon the valves 7 and 8 open until the pressure rises in the mixing chamber 34 by virtue of the mixing of the two fluids at the elevated pressures therein. The valves 10 and 11 are then opened, whereupon the pressure ahead of the valves 7 and 8 drops to terminate the mixing process.

In FIG. 2, we show a turntable 70 carrying a rotational casting mold 72 and also supporting the vessels 1 and 3 as well as the mixing head 9.

SPECIFIC EXAMPLE

A rotation casting having a volume of up to 10,000 liters in the form of a hollw vessel, is cast from a caprolactam mixture at a temperature of 120°C. The caprolactam admixed with (catalyst) in a volume ratio of 200:1 to 200:0.6, is circulated at a rate in excess of 50 kg/min through the pipe 13 at a back pressure of about 10 atmospheres gauge. The caprolactam mixture is maintained at a temperature of 120°C by the heating jacket. The activator is circulated at a back pressure of about 10 to 20 atmospheres gauge through tube 14 at a rate of 0.250 to 0.150 liters/minute as adjusted by the throttle 12. The valves 10 and 11 are then closed to allow the injection-mixing pressure to build up to 100/80 atmospheres gauge, whereupon over a period of about 120 seconds, the mixture is delivered to the cating mold. The latter is rotated at more than 6 rpm and, after cooling, yields a highly uniform hollow body. It should be noted that the pressures are measured at the nozzles or are the equivalent for rigid piping. Where the flexible tubing may expand, the controllable small activator quantity of 150 to 250 g/min. may circulate with a pressure of 70/20 atm below the opening pressure of the valve. Where a 2,000 liter vessel is to be produced, a single charge of about 50 kg may be used and cured for the indicated period. Where a 10,000 liter vessel is made, eight charges of 50 kg each followed by 3 minutes of curing can be used. In general the vessel is rotated at 100 rpm about the main axis and at 8 rpm about a secondary axis.

We claim:

1. A method of forming a mixture in a mixing chamber, comprising the steps of displacing a first fluid component along a path at a dynamic superatmospheric pressure; temporarily blocking the flow of said first component along said path while continuing the displacement thereof to build up pressure along said path to an injection-mixing pressure; and injecting said first component into said mixing chamber when said pressure along said path reaches said injection-mixing pressure and simultaneously injecting a second fluid component into said mixing chamber.

2. The method defined in claim 1, further comprising the step of circulating said first component along a closed path and throttling the circulation of said first component to produce said superatmospheric dynamic pressure therealong.

3. The method defined in claim 1 wherein said superatmospheric dynamic pressure is about 10 atmospheres below said injection-mixing pressure and said second component is mixed in said chamber with said first component in a volume ratio of at least 200:1.

4. The method defined in claim 3 wherein said second component is a lactam and said first component is selected from the group which consists of activators for polymerizing said lactam, catalysts for lactam polymerization and mixtures thereof.

5. The method defined in claim 4, further comprising the step of heating said first component over a portion of said path.

6. The method defined in claim 5, further comprising the step of circulating said second component along a respective closed path.

7. An apparatus for forming a mixture, comprising means forming a mixing chamber; means forming a first path for dynamic displacement of a first component therealong under a dynamic superatmospheric pressure; a pressure-responsive valve connecting said path with said chamber; cut-off means along said path downstream of said valve for temporarily blocking said path and enabling buildup of pressure therein to an injection-building pressure sufficient to enable said first component to traverse said valve and enter said mixing chamber; and injection means for introducing a second fluid component into said mixing chamber simultaneously with the passage of said first component into the latter.

8. The apparatus defined in claim 7 wherein said path is closed for displacement of said first component in said mixing chamber and includes a receptacle for said first component, a pump connected between said receptacle and said valve and a throttle connected between said cut-off means and said receptacle.

9. The apparatus defined in claim 8 wherein said injection means includes a second circulating path for said second component, said second circulating means including a vessel for said second component, a pump connected to said vessel for displacing said second component, a pressure threshold valve connected between said pump and said chamber and duct means connected between said pressure-threshold valve and said vessel for returning the second component to the latter, and a cut-off valve along said duct means operable synchronously with said cut-off means.

10. The apparatus defined in claim 9 wherein each of said paths includes flexible tubes connected to said chamber, said means forming said chamber constituting a portable mixing head.

11. The apparatus defined in claim 9 wherein at least said path for circulating said first component includes a heated conduit traversed by the respective component.

12. The apparatus defined in claim 9, further comprising means for heating said receptacle.

13. The apparatus defined in claim 9, further comprising means for heating said vessel.

14. The apparatus defined in claim 9 for rotational casting of a hollow body with the mixture formed in said chamber, further comprising a turntable carrying a rotational casting mold, at least part of said path being carried on said turntable.

15. The apparatus defined in claim 7 wherein said injection means includes means forming a second path for the dynamic displacement of said second component therealong, each of said paths including a respective pump, a respective receptacle connected to each pump for receiving the respective component from and supplying it to the pump, and a respective throttle valve in one of said paths between one of said pumps and the respective receptacle, said one of said paths being connected to said mixing chamber between the respective pump and said throttle valve.

* * * * *